United States Patent [19]

Ozora

[11] Patent Number: 5,065,493
[45] Date of Patent: Nov. 19, 1991

[54] METHOD OF MAKING A SPHERICAL SEALING BODY USED FOR EXHAUST PIPE JOINT

[75] Inventor: Kazuo Ozora, Fujisawa, Japan
[73] Assignee: Oiles Corporation, Tokyo, Japan
[21] Appl. No.: 674,190
[22] Filed: Mar. 25, 1991

Related U.S. Application Data

[62] Division of Ser. No. 430,363, Nov. 2, 1989.
[51] Int. Cl.$^5$ .................. B21D 39/00; B23P 11/00; B32B 31/04; F16L 19/02
[52] U.S. Cl. .................................. 29/505; 29/888.3; 156/184; 156/192; 156/194; 156/292; 264/103; 264/257; 264/258; 264/273; 264/324; 277/204; 277/229; 277/230
[58] Field of Search ............... 264/103, 257, 258, 273, 264/324; 277/230, 229, 204; 285/910, 422; 156/292, 184, 218, 190–192, 194; 72/352, 357, 358, 361, 370; 29/505, 521, 888.3, 890.08, 17.3, 17.4; 228/265, 115

[56] References Cited

U.S. PATENT DOCUMENTS

| | | |
|---|---|---|
| 2,995,462 | 8/1961 | Mitchell et al. . |
| 3,404,061 | 10/1968 | Shane et al. . |
| 4,208,472 | 6/1980 | Cho et al. . |
| 4,209,177 | 6/1980 | Hall . |
| 4,305,567 | 12/1981 | Lunt . |
| 4,377,892 | 3/1983 | Gonzalez . |
| 4,417,733 | 11/1983 | Usher . |
| 4,423,544 | 1/1984 | Kashmerick et al. . |
| 4,462,603 | 7/1984 | Usher et al. . |
| 4,516,782 | 5/1985 | Usher . |
| 4,547,434 | 10/1985 | Sumiyoshi et al. . |
| 4,551,393 | 11/1985 | Sumiyoshi et al. . |
| 4,554,084 | 11/1985 | Lonne et al. . |
| 4,559,248 | 12/1985 | Sumiyoshi et al. . |
| 4,559,249 | 12/1985 | Arigaya et al. . |
| 4,582,368 | 4/1986 | Fujita et al. . |
| 4,600,201 | 7/1986 | Lönne et al. . |
| 4,601,476 | 7/1986 | Usher et al. . |
| 4,607,851 | 8/1986 | Usher . |
| 4,659,091 | 4/1987 | Baasner et al. . |
| 4,762,330 | 8/1988 | Lönne et al. . |
| 4,871,181 | 10/1989 | Usher et al. . |
| 4,893,847 | 1/1990 | Hess . |
| 4,902,024 | 2/1990 | Takenoshita . |
| 4,928,998 | 5/1990 | Brandener . |
| 4,955,218 | 9/1990 | Brandener .................. 264/324 X |

FOREIGN PATENT DOCUMENTS

| | | |
|---|---|---|
| 44-23966 | 10/1969 | Japan . |
| 54-76759 | 6/1979 | Japan . |
| 58-24620 | 2/1983 | Japan . |
| 58-21144 | 4/1983 | Japan . |

Primary Examiner—Jan H. Silbaugh
Assistant Examiner—Karen Aftergut
Attorney, Agent, or Firm—Nixon & Vanderhye

[57] ABSTRACT

A spherical sealing body is to be inserted in a space defined by three of an end edge of an exhaust pipe on upstream side, a flange fixed on an outer periphery of the exhaust pipe on upstream side, and a concave spherical portion disposed on an end edge of an exhaust pipe on downstream side. The spherical sealing body includes a wire mesh body obtained through weaving or knitting a fine metal wire, the metal mesh body has a cylindrical inner circumferential surface to be fitted in an outer circumferential surface of the exhaust pipe on upstream side, a convex outer circumferential surface to be fitted in the concave spherical portion, and a bottom surface on large diameter side to be abutted against the flange. A refractory material is filled in meshes and clearances of a part of the wire mesh body corresponding to the convex outer circumferential face and the bottom face.

6 Claims, 4 Drawing Sheets

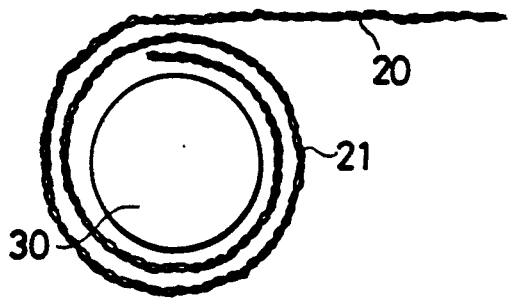
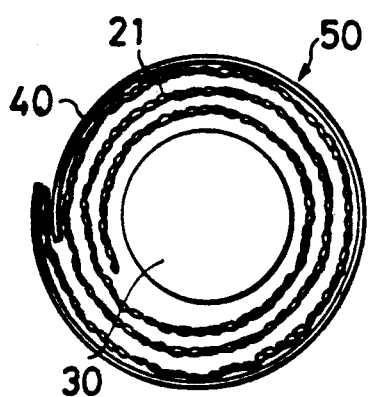
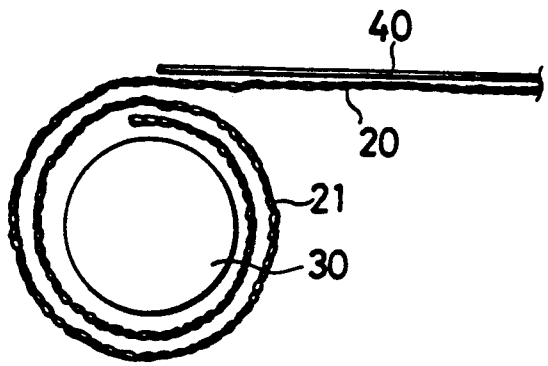
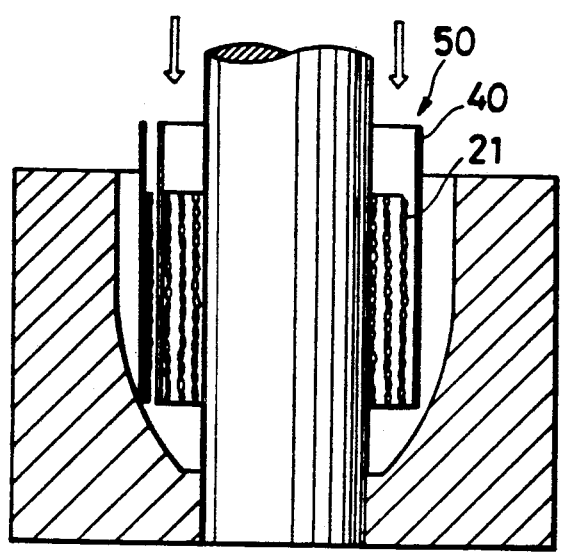
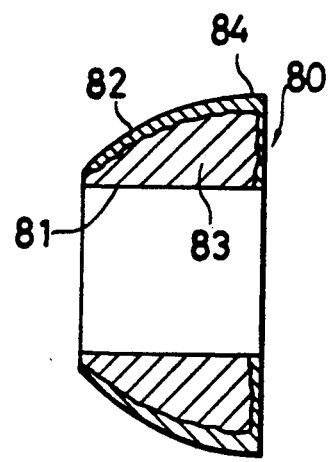

METHOD OF MAKING A SPHERICAL SEALING BODY USED FOR EXHAUST PIPE JOINT

This is a division of application Ser. No. 07/430,363, filed Nov. 2, 1989.

BACKGROUND OF THE INVENTION

The present invention relates to a spherical sealing body used for exhaust pipe joints and a manufacturing method thereof.

An axhaust gas of automobile engine is led through an exhaust pipe disposed on a car body frame or the like from the engine and discharged into the atmosphere, however, the exhaust pipe is subjected to a repetitive bending stress due to torque reaction force of the engine, force of inertia and so forth. Particularly in the case of front wheel drive engine arranged transversely, the bending stress grows heavy as compared with that of the engine arranged longitudinally.

Accordingly, vibrations of the engine will be brought into a car room (to fill with a sound) along an exhaust pipe suspension, or not only thus a noise is caused thereby but also a fatigue fracture is capable of resulting on the exhaust pipe.

To solve such problem, a means has been taken such that a spherical pipe joint is disposed at a predetermined position of the exhaust pipe to absorb the stress.

A spherical sealing member has been used for conventional spherical pipe joints, and a function to allow smoothly a relative angular motion between two of the exhaust pipes arising according as the automobile engine rotates, a sealing function to prevent leakage of an exhaust gas from a pipe joint portion, a function to absorb infinitesimal vibrations of the exhaust pipe arising according as the automobile engine rotates and so forth are required for the spherical sealing member.

As disclosed, for example, in Japanese Patent Publication (kokoku) No. 58-21144, that for which a wire mesh and a sheet-like refractory material (expanded graphite sheet, mica sheet or the like) are laminated with each other, wound cylindrically to obtain a preform body, and then the preform body which is compressed axially thereof has been used so far as the spherical sealing member.

The above-described sealing member consisting of a wire mesh and a refractory material has an integrity in structure such that the refractory material is filled thoroughly in the wire mesh and clearance and thus both are entangled with each other in order, and the refractory material exposed on a convex spherical surface of the sealing member is provided with a flexibility itself and hence is fittable well to the mating surface, therefore a sealing function to the leakage of an exhaust gas at the spherical joint portion is enhanced, however, since the sealing member itself works as a rigid body to infinitesimal vibrations arising on the exhaust pipe, an absorbability of the vibrations can hardly be expected, thus leaving the problem of generation of a noise due to the vibrations and a sound filled in a car room.

SUMMARY OF THE INVENTION

An object of the invention is to provide a spherical sealing body used for exhaust pipe joints and also to obtain a manufacturing method thereof, wherein a compressed preform consisting of a wire mesh unitary member is ensured well for elasticity and provided with a satisfactory function to absorb vibrations, and a sealing function at the exhaust pipe joint is satisfied full at a specific portion of the sealing body.

The object of the present invention can be achieved by a spherical sealing body which is to be inserted in a space defined by three of an end edge of an exhaust pipe on upstream side (engine side), a flange fixed on an outer periphery of said exhaust pipe on upstream side, and a concave spherical portion disposed on an end edge of an exhaust pipe on downstream side (atmosphere side), comprising a wire mesh body obtained through weaving or knitting a fine metal wire, said metal mesh body having a cylindrical inner circumferential surface to be fitted in an outer circumferential surface of said exhaust pipe on upstream side, a convex outer circumferentail surface to be fitted in said concave spherical portion, and a bottom surface on large diameter side to be abutted against said flange, a refractory material being filled in meshes and clearances of a part of said wire mesh body corresponding to said convex outer circumferential face and said bottom face.

Further, the object of the present invention can be achieved by a manufacturing method of a spherical sealing body which is to be inserted in a space defined by three of an end edge of an exhaust pipe on upstream side, a flange fixed on an outer periphery of said exhaust pipe on upstream side, and a concave spherical portion disposed on an end edge of an exhaust pipe on downstream side, comprising the steps of;

preparing a band-like wire mesh obtained through weaving or knitting a fine metal wire;

winding said wire mesh in cylinder at least two turns to thereby form a partial cylindrical part;

putting a refractory sheet material wider than said wire mesh over a part of said wire mesh other than said partial cylindrical part;

winding round said partial cylindrical part said part of said wire mesh over which said refractory sheet material is put, to thereby form a preform body with said refractory material sheet projecting from one end of said partial cylindrical part; and compressing said preform body from an outer circumferential side of said preform body and also from one end side of said partial cylindrical part.

In the spherical sealing body and its manufacturing method, a wire mesh obtained from weaving or knitting fine metal wires such as stainless steel wire or iron wire like austenite SUS304, SUS316, ferrite SUS430, zinc-plated iron wire (JIS-G-3532) and the like is used as the wire mesh.

That of 3 to 5 mm in mesh size is used for the woven or knitted wire mesh.

An expanded graphite is preferable as the refractory material. "GRAFOIL (trade name)" by Union Carbide Co., U.S.A. which is disclosed in Japanese Patent Publication No. 44-23966, or "NICAFILM (trade name)" by Nippon Carbon Co., Japan will be used for the expanded graphite, and a mica paper (sheet) bonded with silicon is used for the mica.

It is preferable that a sliding member in the manufacturing method according to the invention be made of tetrafluoroethylene resin. The sliding member may comprise using: (1) that for which tetrafluoroethylene resin film or tape is put over the expanded graphite, these are then compressed on a roller to integration, and a tetrafluoroethylene resin layer is formed on one side of the expanded graphite sheet, or (2) that for which an expanded graphite sheet is put over the wire mesh and a tetrafluoroethylene resin film or tape is further put over the expanded graphite sheet, these are compressed on a roller to integration, and a tetrafluoroethylene resin layer is formed on the surface.

Then, an unsintered film or tape which is 0.05 to 0.5 mm thick is used for the tetrafluoroethylene resin film or tape of which the sliding member is formed.

For example, an unsintered film or tape of tetrafluoroethylene obtained through a paste extrusion molding of fine powder of tetrafluoroethylene resin (TEFLON 6J, POLYFLON F101, FLUON CD1 in trade name each) may be taken preferable.

The spherical sealing body of the invention is incorporated in the above-mentioned exhaust pipe joint.

That is, an inner peripheral surface of the spherical sealing body is fitted in an outer peripheral surface of an end portion of the exhaust pipe on upstream side, an end surface on large diameter side is brought into contact with a flange fixed on the upstream side exhaust pipe to come at the outer peripheral surface of the end portion of the upstream side exhaust pipe, and an outer peripheral surface of the spherical sealing body is engaged slidingly with the inside of a convex spherical portion formed on an end portion of the downstream side exhaust pipe.

In this case, since a vibration absorption part comprising wire mesh is formed on an inner circumferential surface side of the spherical sealing body fitted in the outer circumferential surface of the end portion of the upstream side exhaust pipe, vibrations of the exhaust pipe from an automobile engine are absorbed on an elasticity of the vibration absorption part of the spherical sealing body, and thus a generation of noise due to vibrations of the exhaust pipe and sound filled in a car room resultantly may be prevented.

It is necessary that the vibration absorption part comprising wire mesh be formed to have a reasonable width covering from inner circumferential surface side to outer circumferential surface side on which the spherical sealing body is fitted in the outer circumferential surface of the exhaust pipe, and, in this connection, it has been confirmed that a desired elasticity may be ensured by winding it round a core at least two turns at the time when the spherical sealing body is produced.

Then, a sealing part comprising a wire mesh and a refractory material filled in meshes of the wire mesh and clearances is formed on the outer circumferential surface of the spherical sealing body and the end surface on large diameter side thereof, and since a space against the flange fixed on the upstream side exhaust pipe and a space against an inside of the concave spherical portion formed on the end portion of the downstream side exhaust pipe are sealed up with the sealing part, a leakage of exhaust gas from the exhaust pipe joint portion will be prevented.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 1 is a plan view of a wire mesh provided with a partial cylindrical part;

FIG. 2 is a plan view showing a state wherein a refractory material is put over the rest portion of the wire mesh provided with the partial cylindrical part;

FIG. 3 is a plan view showing a preform body;

FIG. 4 is a longitudinal sectional view showing a compression forming process;

FIG. 5 is a longitudinal sectional view showing a spherical sealing body;

DESCRIPTION OF THE PREFERRED EMBODIMENTS

One embodiment of the exhaust pipe joint of this kind which is known well hitherto will be described with reference to FIG. 14.

Figure 14:
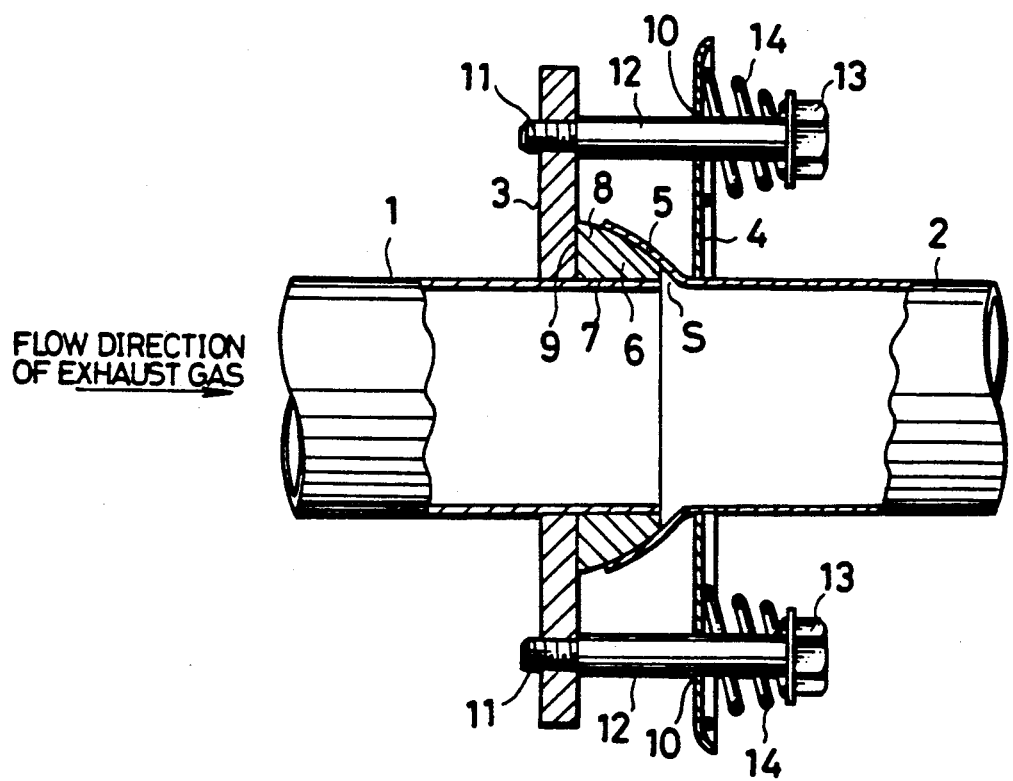
FIG. 14 is an explanation view illustrating prior art.

In FIG. 14, an exhaust pipe 1 on upstream side (engine side) and an exhaust pipe 2 on down stream side (atmosphere side) are disposed on the same axis so as to be opposite to each other as leaving a slight clearance S between end portions.

A flange 3 is fixed on an outer periphery of the end portion of the pipe 1. Another flange 4 is fixed on an outer periphery of the end portion of the pipe 2. A concave spherical portion 5 is provided on an end edge of the pipe 2. A spherical sealing member 6 is inserted in a space defined by three of an end edge of the pipe 1, the flange 3 and the concave spherical portion 5. The sealing member 6 has a cylindrical inner circumferential surface 7 fitted in an outer circumferential surface of the pipe 1, a convex outer circumferential surface 8 fitted in the concave spherical portion 5, and a bottom surface 9 on large diameter side abutted against the flange 3.

The flanges 3, 4 are coupled with each other by a pair of bolts 12 passed through a hole 10 of the flange 4 and having a screw 11 set in the flange 3. The flange 4 is urged toward the flange 3 by a coil spring 14 provided between a head 13 of the bolt 12 and the flange 4.

The outer circumferential surface 8 of the sealing member 6 and the concave spherical portion 5 of the pipe 2 are adapted to come in contact movably relatively under pressure on an action of the coil spring 14.

Embodiments of the spherical sealing body according to the present invention will now be described in detail with reference to FIG. 1 to FIG. 13 of the accompanying drawings representing its manufacturing method each.

EMBODIMENT I (1) First Process

A knitted wire mesh 20 of 3 mm in mesh size and 50 mm in width is prepared from using a fine metal wire SUS403 of 0.28 mm in diameter. The knitted wire mesh 20 is wound round a core 30 two turns to form a partial cylindrical part 21 on the wire mesh 20 (FIG. 1).

(2) Second Process

An expanded graphite sheet of "NICAFILM" (trade name) by Nippon Carbon Co. 0.5 mm thickness and 60 mm width is prepared as a refractory material 40, and the expanded graphite sheet is put over the rest portion of the wire mesh 20 on which the partial cylindrical part 21 is formed (FIG. 2). Both are wound cylindrically in succession on the partial cylindrical part 21, and a preform body 50 with the refractory material 40 projecting on one end portion of the preform body 50 is formed (FIG. 3).

(3) Third Process

The preform body 50 is set in a metallic mold 70 provided with a partial concave spherical surface 71 and a mandrel 72 inside so as to be fitted on an outer circumferential surface of the mandrel 72 (FIG. 4). The preform body 50 is compressed along a longitudinal axis of the preform body 50, thereby obtaining a spherical sealing body 80 provided with a cylindrical inner circumferential surface 81 and a partial convex spherical outer circumferential surface 82 (FIG. 5).

The sealing body 80 thus obtained is provided with a vibration absorption part 83 and a sealing part 84.

The vibration absorption part 83 comprises the wire mesh 20 formed ranging from the inner circumferential surface 81 side to the outer circumferential surface 82 side in a predetermined width.

The sealing part 84 comprises the wire mesh 20 formed on the outer circumferential surface part 82 and the large diameter side end surface of the sealing body 80 to thereby cover the vibration absorption part 83 integrally with the vibration absorption part 83, and the refractory material 40 filled in meshes and clearances of the wire mesh 20.

EMBODIMENT II

(1) First Process

As in the case of Embodiment I, the knitted wire mesh 20 of 3 mm is mesh size and 50 mm width is prepared from using SUS403 of 0.28 mm in size as fine metal wire. The knitted wire mesh 20 is wound round the core 30 two turns to form the partial cylindrical part 21 on the wire mesh 20 (FIG. 2).

(2) Second Process

As in the case of Embodiment I, an expanded graphite sheet of ("NICAFILM" (trade name) by Nippon Carbon Co.) 0.5 mm thickness and 60 mm width is prepared as the refractory material 40, the expanded graphite sheet is then put over the rest portion of the wire mesh 20 on which the partial cylindrical part 21 is formed (FIG. 2). Both are wound cylindrically in succession on the partial cylindrical part 21, and the first preform body 50 with the refractory material 40 projecting on one end portion of the preform 50 is formed (FIG. 3).

(3) Third Process

Figure 6:
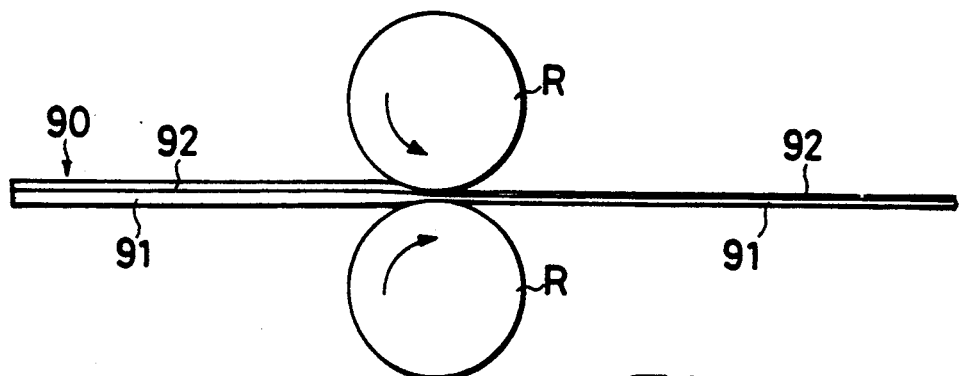
FIG. 6 is a longitudinal sectional view showing a sliding member.

An expanded graphite sheet 91 same in width as the wire mesh 20 is prepared separately, and a tetrafluoroethylene resin unsintered tape 92 is put over the sheet 91. The two are passed between rollers R, R to compress the tape 92 onto one surface of the sheet 91 to integration, thereby forming a tetrafluoroethylene resin layer as a sliding member 90 (FIG. 6).

(4) Fourth Process

Figure 7:
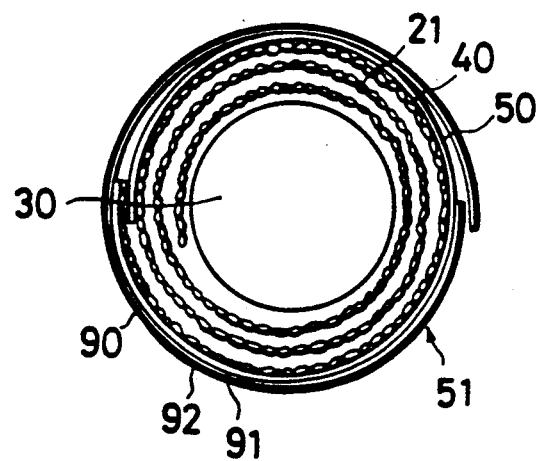
FIG. 7 is a plan view showing a preform body.

With the tape 92 coming outside, the sliding member 90 is wound round a circumferential surface of the preform body 50 obtained through the second process, thereby forming a second preform body 51 (FIG. 7).

(5) Fifth Process

Figure 8:
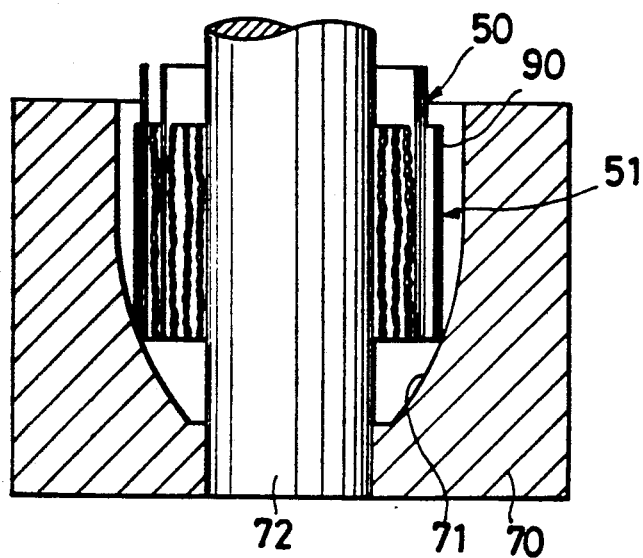
FIG. 8 is a longitudinal sectional view showing a compression forming process.
Figure 9:
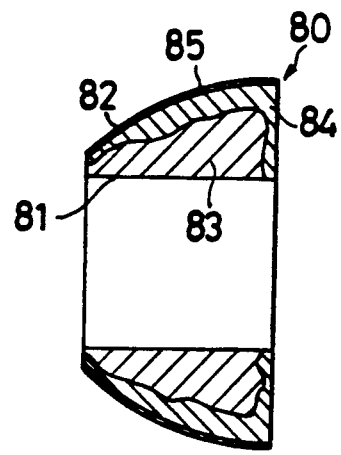
FIG. 9 is a longitudinal sectional view showing a spherical sealing body.

The preform body 51 is set in the metallic mold 70 provided with the partial concave spherical peripheral surface 71 and the mandrel 72 so as to be fitted on an outer circumferential surface of the mandrel 72 (FIG. 8). The preform body 51 is compressed along a longitudinal axis of the preform body 51, thereby obtaining the spherical sealing body 80 provided with the cylindrical inner circumferential surface 81 and the partial convex spherical outer circumferential surface 82 (FIG. 9).

The sealing body 80 thus obtained is provided with a vibration absorption part 83, a sealing part 84, and a sliding face part 85.

The vibration absorption part 83 comprises the wire mesh 20 formed ranging from the inner circumferential surface 81 side to the outer circumferential 82 side in a predetermined width.

The sealing part 84 comprises the wire mesh 20 formed on the outer circumferential surface part 82 and the large diameter side end surface of the sealing body 80 to thereby cover the vibration absorption part 83, and the refractory material 40 filled in meshes and clearances of the wire mesh 20.

The sliding face part 85 comprises the tetrafluoroethylene resin layer of the sliding member 90 covering a convex spherical surface of the sealing member 84 and formed integrally with the sealing member 84.

EMBODIMENT III

The embodiment refers to another manufacturing method of the spherical sealing body given in the aforementioned Embodiment II.

(1) First Process

As in the case of Embodiment I, the knitted wire mesh 20 of 3 mm in mesh size and 50 mm width is prepared from using SUS403 of 0.28 mm in size as fine metal wire. The knitted wire mesh 20 is wound round the core 30 two turns to form the partial cylindrical part 21 on the wire mesh 20 (FIG. 1).

(2) Second Process

Figure 10:
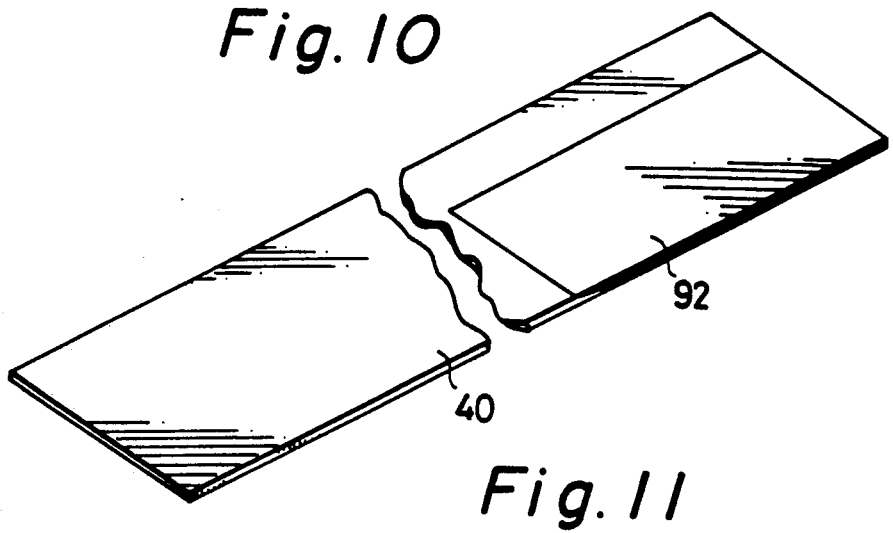
FIG. 10 and FIG. 11 are longitudinal sectional views showing a refractory material respectively.
Figure 11:
Figure 12:
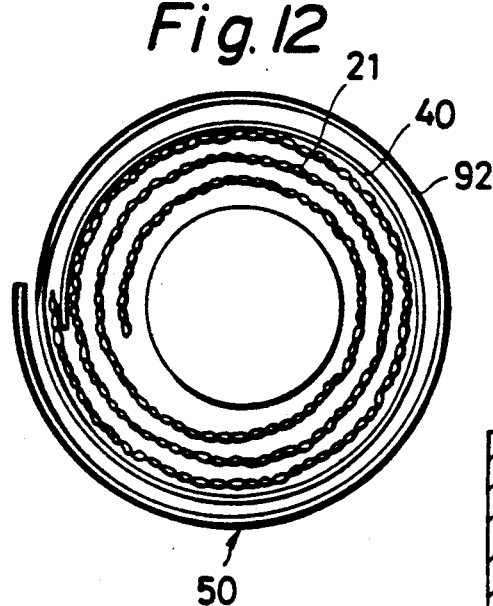
FIG. 12 is a plan view showing a preform body.

An expanded graphite sheet of 0.5 mm thickness and 60 mm width is prepared as the refractory material 40, and the tetrafluoroethylene resin unsintered tape 92 is put over the surface of one end portion of the expanded graphite sheet in width corresponding to the same width (50 mm) as the wire mesh 20. Both are passed between the rollers R, R and thus compressed to integration, thereby forming a tetrafluoroethylene resin layer on the surface of one end portion of the expanded graphite sheet (FIG. 10 and FIG. 11).

(3) Third Process

Figure 13:
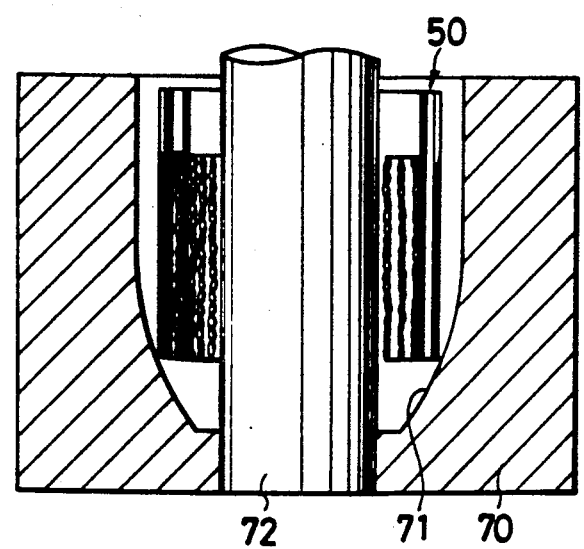
FIG. 13 is a longitudinal sectional view showing a compression forming process.

The refractory material 40 provided with the tetrafluoroethylene resin layer on the surface of one end portion of the expanded graphite sheet is put over the rest portion of the wire mesh 20 on which the partial cylindrical part 21 is formed, and both are wound cylindrically in succession to the partial cylindrical part 21 so as to position only the refractory material 40 provided with the tetrafluoroethylene resin layer on the outermost periphery, thus forming the preform body 50 with the refractory material 40 projecting on one end portion of the preform body 50 (FIG. 13).

(4) Fourth Process

The preform body 50 is set in the metallic mold 70 provided with the partial concave spherical inner circumferential surface 71 and the mandrel 72 inside so as to be fitted on an outer circumferential surface of the mandrel 72 (FIG. 13). The preform body 50 is compressed along a longitudinal axis of the preform body 50, thereby obtaining the spherical sealing body 80 provided with the cylindrical inner circumferential surface 81 and the partial convex spherical outer circumferential surface 82 (FIG. 9).

The sealing body 80 thus obtained is provided with a vibration absorption part 83, a sealing part 84, and a sliding face part 85.

The vibration part 83 comprises the wire mesh 20 formed ranging from the inner cirumferential surface 81 side to the outer circumferential 82 side in a predetermined width. The sealing part 84 comprises the wire mesh 20 formed on the outer circumferential surface part 82 and the large diameter side end surface of the sealing body 80 to thereby cover the vibration absorption part 83, and the refractory material 40 filled in meshes and clearances of the wire mesh 20.

The sliding face part 85 comrpises the tetrafluoroethylene resin layer of the sliding member 90 formed on a convex spherical surface of the sealing member 84.

A function of the sealing member of the spherical sealing body described as above has been affirmed by the following test.

TEST CONDITIONS

The spherical sealing body constructed as described above was incorporated in the exhaust pipe joint shown in FIG. 14, and subjected to a test under the following conditions:

| | |
|---|---|
| Compressing force | 40 kg |
| Angle of oscillation | ±3° |
| Frequency | 10 Hz |
| Atmospheric temperature | room temperature to 500° C. |
| Pressure in the pipe | 0.3 kg/cm$^2$ |

TEST METHOD

The test comprises 8 cycles each coming in 250,000 in total number of times for oscillation, as: 45,000 times first with oscillating motion ±3° at 10 Hz in frequency as constituting one time; then atmospheric temperature increased up to 500° C. as keeping the motion on (number of oscillations being 45,000 times, then); oscillating motion kept 115,000 times at the point in time when atmospheric temperature reaching 500°C.; atmospheric temperature decreased to room temperature as keeping the motion still on (number of oscillations being 45,000 times, then).

A result of the above test is given below.

| | | Cycle number | Gas leakage | Oscillating torque |
|---|---|---|---|---|
| Sealing body of the embodiment according to the present invention | A | 500,000 | 0.6 l/min | 100 kg-cm |
| | | 1,000,000 | 0.6 l/min | |
| | | 1,500,000 | 0.6 l/min | |
| | | 2,000,000 | 0.6 l/min | |
| | B | 500,000 | 0.6 l/min | 60 kg-cm |
| | | 1,000,000 | 0.6 l/min | |
| | | 1,500,000 | 0.6 l/min | |
| | | 2,000,000 | 0.6 l/min | |

-continued

| | Cycle number | Gas leakage | Oscillating torque |
|---|---|---|---|
| Prior art sealing body (Japanese Patent Publication No. 58-21144) | 500,000 | 0.6 l/min | 100 kg-cm |
| | 1,000,000 | 0.5 l/min | |
| | 1,500,000 | 0.5 l/min | |
| | 2,000,000 | 0.5 l/min | |

In the above table, the sealing body A is a sealing body provided with an oscillation absorption part 83 and sealing part 84, and the sealing body B is a sealing body provided with an oscillation absorption part 83, a sealing part 84 and a sliding face part 85.

The above test result has ensured that the sealing body A, B have a sealing function almost equivalent to that of the prior art sealing body (Japanese Patent Publication No. 58-21144).

Then, in addition to the working effect described as above, the spherical sealing body A, B has an effect the realizing therethrough a smoother relative angular motion arising on the exhaust pipes on upstream and downstream sides, the effect preventing a generation of slide frictional noise between a protuberant spherical surface portion of the sealing body and a recessed spherical surface portion of the exhaust pipe on upstream side.

The above has been affirmed from a test result of the oscillating torque (kg-cm) carried out on the same conditions as the aforementioned test. The result is also given in the above table. Then, the oscillating torque is a mean value of those obtained at the point in time when each cycle ends.

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of manufacturing a spherical sealing body which is to be inserted in a space defined by an end edge portion of a first section of an exhaust pipe, a flange fixed on an outer periphery of said first section of said exhaust pipe, and a concave spherical portion disposed on an end edge of a second section of said exhaust pipe downstream from said first section, comprising the steps of;

preparing a wire mesh by weaving or knitting a fine metal wire;

winding said wire mesh in at least two turns about a cylinder to thereby form a partial cylindrical part;

placing a refractory material sheet, wider than said wire mesh, over a part of said wire mesh extending from said partial cylindrical part such that said wider refractory material sheet projects from one side of said wire mesh;

winding about said partial cylindrical part said part of said wire mesh having said refractory material sheet thereon, to thereby form a preform body with said refractory material sheet projecting from said one side of said wire mesh and therefore from one end of said partial cylindrical part; and compressing said preform body from an outer circumferential side of said preform body and also from said one end of said partial cylindrical part to thereby form said spherical sealing body having said refractory material sheet filled in meshes and clearances of said wire mesh at said circumferential side of said preform body and having said projecting refractory material sheet compressed over said one end of said partial cylindrical part and filled in said meshes and clearances of said wire mesh at said one end of said partial cylindrical part.

2. A manufacturing method according to claim 1, wherein a mesh size of said wire mesh is 3 to 5 mm.

3. A manufacturing method according to claim 1, wherein said refractory material sheet comprises expanded graphite.

4. A manufacturing method according to claim 1, wherein said refractory material sheet comprises mica.

5. A manufacturing method according to claim 1, wherein said refractory material sheet is provided with a sliding member, and said placing step comprises a step of placing said refractory material sheet over said part of said wire mesh extending from said partial cylindrical post so as to position said sliding member over said refractory material sheet which is over said part of said wire mesh extending from said partial cylindrical part.

6. A manufacturing method according to claim 5, wherein said sliding member comprises a tetrafluoroethylene resin.

* * * * *